US008639207B2

(12) United States Patent
Tsunoda

(10) Patent No.: US 8,639,207 B2
(45) Date of Patent: Jan. 28, 2014

(54) ELECTRONIC APPARATUS CAPABLE OF REDUCING POWER CONSUMPTION, CONTROL METHOD THEREFOR, AND STORAGE MEDIUM

(75) Inventor: Masami Tsunoda, Yokohama (JP)

(73) Assignee: Canon Kabushiki Kaisha (JP)

( * ) Notice: Subject to any disclaimer, the term of this patent is extended or adjusted under 35 U.S.C. 154(b) by 234 days.

(21) Appl. No.: 13/159,508

(22) Filed: Jun. 14, 2011

(65) Prior Publication Data

US 2011/0306382 A1 Dec. 15, 2011

(30) Foreign Application Priority Data

Jun. 14, 2010 (JP) .................................. 2010-135022

(51) Int. Cl.
*H04B 1/16* (2006.01)
(52) U.S. Cl.
USPC ........ 455/343.1; 455/574; 455/446; 455/403; 455/445; 455/422.1; 455/557; 455/428; 455/560; 455/419; 455/510; 348/207.1; 348/372; 348/207.2; 348/231.2; 348/211; 370/238; 370/465; 370/545; 370/351; 370/310
(58) Field of Classification Search
USPC .............. 455/574, 446, 403, 445, 422.1, 557, 455/560, 428, 419, 510, 450, 406, 524, 462, 455/459; 348/207.1, 372, 207.2, 231.2, 348/211, 222, 723, 722, 705, 724, 212, 348/231; 370/238, 465, 545, 351, 310, 394, 370/412, 328, 331, 318, 347, 338, 349
See application file for complete search history.

(56) References Cited

U.S. PATENT DOCUMENTS

| 7,356,360 | B2 * | 4/2008 | Katayama et al. ............ 455/574 |
| 7,586,524 | B2 * | 9/2009 | Tsue et al. .................. 348/231.2 |
| 7,777,779 | B2 * | 8/2010 | Yasuda ....................... 348/207.2 |
| 2002/0054233 | A1 * | 5/2002 | Juen ............................... 348/372 |
| 2007/0230332 | A1 * | 10/2007 | Fukasawa ..................... 370/217 |
| 2009/0128634 | A1 * | 5/2009 | Miura et al. ............... 348/207.1 |
| 2010/0220702 | A1 * | 9/2010 | Hiroyuki et al. ............. 370/338 |
| 2010/0245886 | A1 * | 9/2010 | Okajima et al. ............. 358/1.15 |

FOREIGN PATENT DOCUMENTS

JP H03-263090 A 11/1991

\* cited by examiner

*Primary Examiner* — Fayyaz Alam
*Assistant Examiner* — Ganiyu A Hanidu
(74) *Attorney, Agent, or Firm* — Rossi, Kimms & McDowell LLP

(57) ABSTRACT

An electronic apparatus which is capable of appropriately providing notification about a connecting state and an operating state of a wireless communication unit, and reducing power consumption. Upon receiving a beacon signal from a wireless communication access point with a predetermined period, a notification unit provides notification that the wireless communication unit is linked to the wireless communication access point. Based on a time corresponding to the predetermined period, the wireless communication unit is returned into a first state from a second state in which a smaller amount of power is consumed than in the first state. When the wireless communication unit lies in the second state, the notification unit is intermittently disabled, and when the wireless communication unit returns from the second state into the first state, the notification unit is disabled.

13 Claims, 9 Drawing Sheets

ELECTRONIC APPARATUS CAPABLE OF REDUCING POWER CONSUMPTION, CONTROL METHOD THEREFOR, AND STORAGE MEDIUM

BACKGROUND OF THE INVENTION

1. Field of the Invention

The present invention relates to an electronic apparatus having a wireless communication unit, a control method therefor, and a storage medium, and in particular to an electronic apparatus capable of providing notification about a state of connection with a wireless access point, and reducing power consumption, a control method therefor, and a computer-readable storage medium storing a program for implementing the method.

2. Description of the Related Art

In recent years, local area networks (LANs) using wireless communication, and so-called wireless LANs have been in widespread use. In wireless LANs, a wireless communication unit which a terminal apparatus (for example, an electronic apparatus) or the like has is connected to a network via a so-called wireless communication access point.

In such wireless LANs, as distinct from wired LANs, it is difficult to ascertain whether or not the wireless communication unit and the network are normally connected to each other by simply checking the connecting status of a cable.

For this reason, to provide notification about a connecting state and an operating state of the wireless communication unit in the wireless LANs, it has been proposed to light up a lamp such as an LED to notify a connecting state and others (see, for example, Japanese Laid-Open Patent Publication (Kokai) No. H03-263090).

On the other hand, due to promotion of energy saving in recent years, there is a growing need for techniques to reduce power consumption of even the wireless communication unit. Thus, when not operating, the wireless communication unit is held in a low power consumption state (so-called energy-saving mode).

In the wireless communication unit, while a lamp that indicates a connecting state and an operating state of the wireless communication unit is illuminating (that is, the lamp is on), power is being consumed as a matter of course. Moreover, a radio-frequency circuit used in the wireless communication unit generally consumes a large amount of power, and in the energy-saving mode, power consumed by the lamp and the radio-frequency circuit cannot be ignored.

For this reason, in the energy-saving mode, it is necessary to reduce current (or power) consumed by even the lamp, and further, it is necessary to properly check a state of connection in the energy-saving mode.

SUMMARY OF THE INVENTION

The present invention provides an electronic apparatus capable of appropriately providing notification about a connecting state and an operating state of a wireless communication unit, and reducing power consumption, a control method for the apparatus, and a computer-readable storage medium storing a control program for causing a computer to implement the method.

Accordingly, a first aspect of the present invention provides an electronic apparatus having a wireless communication unit, and capable of communicating with other apparatuses using the wireless communication unit via a wireless communication access point, comprising a notification unit configured to, upon receiving a beacon signal from the wireless communication access point with a predetermined period, provide notification that the wireless communication unit is linked to the wireless communication access point, a returning unit configured to, based on a time corresponding to the predetermined period, return the wireless communication unit into a first state from a second state in which a smaller amount of power is consumed than in the first state, and a control unit configured to, when the wireless communication unit lies in the second state, intermittently disable the notification unit, and when the wireless communication unit returns from the second state into the first state, disable the notification unit.

Accordingly, a second aspect of the present invention provides a control method for an electronic apparatus having a wireless communication unit and capable of communicating with other apparatuses using the wireless communication unit via a wireless communication access point, and further having a notification unit that, upon receiving a beacon signal from the wireless communication access point with a predetermined period, provides notification that the wireless communication unit is linked to the wireless communication access point, comprising a notification step of providing notification that the wireless communication unit is linked to the wireless communication access point, a returning step of, based on a time corresponding to the predetermined period, returning the wireless communication unit into a first state from a second state in which a smaller amount of power is consumed than in the first state, and a control step of, when the wireless communication unit lies in the second state, intermittently disabling the notification unit, and when the wireless communication unit returns from the second state into the first state, disabling the notification unit.

Accordingly, a third aspect of the present invention provides a non-transitory computer-readable storage medium storing a control program for causing a computer to implement a control method for an electronic apparatus having a wireless communication unit and capable of communicating with other apparatuses using the wireless communication unit via a wireless communication access point, and further having a notification unit that, upon receiving a beacon signal from the wireless communication access point with a predetermined period, provides notification that the wireless communication unit is linked to the wireless communication access point, the control method comprising, a notification step of providing notification that the wireless communication unit is linked to the wireless communication access point, a returning step of, based on a time corresponding to the predetermined period, returning the wireless communication unit into a first state from a second state in which a smaller amount of power is consumed than in the first state, and a control step of, when the wireless communication unit lies in the second state, intermittently disabling the notification unit, and when the wireless communication unit returns from the second state into the first state, disabling the notification unit.

According to the present invention, a user can be appropriately notified of a connecting state between a wireless communication access point and the wireless communication unit and an operating state of the wireless communication unit, and moreover, power consumption can be reduced.

Further features of the present invention will become apparent from the following description of exemplary embodiments (with reference to the attached drawings).

BRIEF DESCRIPTION OF THE DRAWINGS

FIGS. 10A and 10B are flowcharts useful in explaining how turning-on/off of an LED is controlled by the printer controller appearing in FIG. 5, in which FIG. 10A is a flowchart useful in explaining a process carried out to start the MFP, and FIG. 10B is a flowchart useful in explaining a process carried out after the WLAN goes into a low power consumption state.

DESCRIPTION OF THE EMBODIMENTS

A description will now be given of an exemplary wireless communication unit according to an embodiment of the present invention.

Figure 1:
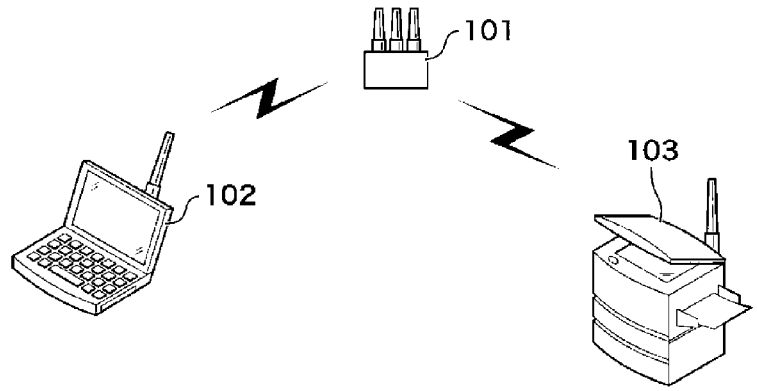
FIG. 1 is a diagram showing an exemplary printing system in which an exemplary wireless communication unit according to the present invention is used.

FIG. 1 is a diagram showing an exemplary printing system in which the exemplary wireless communication unit according to the present invention is used.

Referring to FIG. 1, the illustrated printing system has a wireless communication access point (hereafter referred to as the AP) 101 which is a relay station, an information processing apparatus (for example, a personal computer (PC)) 102, and a multi-functional printer (an MFP, i.e., an electronic apparatus) 103. The PC 102 and the MFP 103 each have a wireless communication unit (not shown in FIG. 1), and perform wireless communication with each other via the AP 101.

The MFP 103 has a plurality of functions such as image scanning, printing, and copying, and for example, executes a print job or the like in response to an instruction from the PC 102. The MFP 103 then performs printing based on print data obtained as a result of the execution of the print job or the like. The MFP 103 may also send the print data obtained as a result of the execution of the print job or the like to the PC 102 via the AP 101.

It should be noted that in the illustrated example, there is only one PC 102, but actually, a plurality of PCs 102 are connected to the AP 101. Also, there may be a plurality of MFPs 103. The PC 102 performs displaying, editing, and so on of various data using various application programs. The PC 102 then sends and receives data to and from the MFP 103 through warless communication via the AP 101 as described above.

Figure 2:
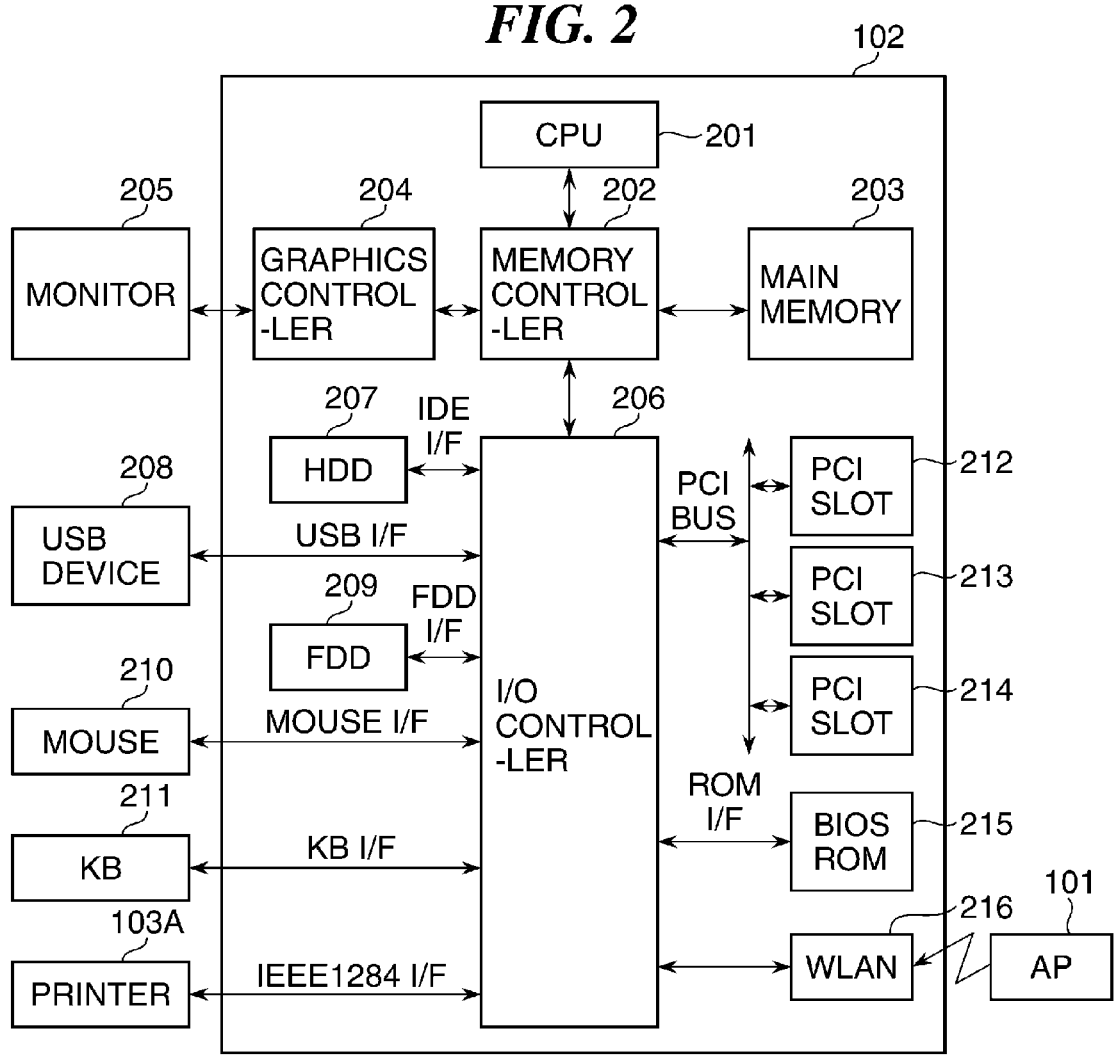
FIG. 2 is a block diagram showing an exemplary arrangement of a PC appearing in FIG. 1.

FIG. 2 is a block diagram showing an exemplary arrangement of the PC 102 appearing in FIG. 1.

Referring to FIG. 2, a monitor 205, a USB device 208, a mouse 210, a keyboard (KB) 211, and a printer 103A are connected to the illustrated PC 102. The PC 102 has a CPU 201, to which a memory controller 202 is connected. A graphics controller 204, a main memory 203, and an I/O (input/output) controller 206 are connected to the memory controller 202.

As shown in the figure, the monitor 205 is connected to the graphics controller 204. The USB device 208, the mouse 210, the KB 211, and the printer 103A are connected to the I/O controller 206 via a USB I/F, a mouse I/F, a KB I/F, and an IEEE1284 I/F, respectively. Further, an HDD 207 and an FDD 209 are connected to the I/O controller 206 via an IDE (integrated device electronics) I/F and an FDD I/F, respectively. In addition, a plurality of PCI slots 212 to 214 are connected to the I/O controller 206 via a PCI bus, and a BIOS (basic input/output system) ROM 215 is connected to the I/O controller 206 via a ROM I/F. A wireless communication unit (wireless LAN) 216 is also connected to the I/O controller 206.

The CPU 201 controls the entire PC 102 in accordance with control programs stored in the BIOS ROM 215 or the HDD 207.

Under the control of the CPU 201, the memory controller 202 controls reading and writing from and into the main memory 203, and controls the graphics controller 204 and the I/O (input-output) controller 206. The memory controller 202 reads, for example, various programs stored in the HDD 207 via the I/O controller 206, and stores them in the main memory 203. The CPU 201 executes various programs (including applications) stored in the main memory 203.

Further, the main memory 203 is used as a work area for the CPU 201 to operate. For example, in the main memory 203, data to be processed is stored, and output data is temporarily stored.

The graphics controller 204 acts as a user interface, and displays display data such as characters, figures, and images on the monitor 205 to notifies a user of necessary information. It should be noted that the graphics controller 204, which has a graphics memory (not shown), temporarily stores display data to be displayed in a graphics memory, and displays the same on the monitor 205.

The I/O controller 206 controls reading and writing of the HDD 207, the FDD 209, and the USB device 208, and controls input-output of the mouse 210, the KB 211, and the printer 103A.

Further, the I/O controller 206 controls, for example, the PCI bus to which the PCI (peripheral component interconnect) slots 212 to 214 are connected, and controls reading and writing of the BIOS ROM 215. In addition, the I/O controller 206 acts as a physical interface for the AP 101, and executes control protocols for connection with the Internet.

The HDD (hard disk drive) 207 is connected to the I/O controller 206 via an IDE interface (IDE I/F). In the illustrated example, an OS (operating system) and application pograms are stored in the HDD 207.

Further, in the HDD 207, driver programs for controlling input-output devices such as the printer 103A are recorded, and data required for executing programs and various data created by the user are stored.

The illustrated USB device 208 is a generic name for input-output devices capable of connecting to a USB interface, and when necessary, the user uses various input-output devices by connecting them to USB interfaces. Examples of those input-output devices include a keyboard, a mouse (pointing device), an image reader, a digital camera, a film scanner, a printer, a CD-ROM drive, a DVD drive, an expanded HDD, an external HDD, and an IC card.

A floppy (registered trademark) disk, which is a removable storage medium, is inserted into the FDD 209, and data is written into and read from the floppy (registered trademark) disk by the FDD 209. It should be noted that the user can interactively interface with the PC 102 by using the pointing device 210 such as a mouse in coordination with the monitor 205 under the control of the CPU 201, that is, under the control of the OS.

The user can input various character codes to the PC 102 using the KB 211. As described above, the PCI slots 212 to 214 are connected to the I/O controller 206 via the PCI bus. Printed circuit boards or the like for adding various functions are inserted into the PCI slots 212 to 214, and various data is read from and written into the printed circuit boards via the PCI bus.

A low-functionality I/O control program as the lowest layer is stored in the BIOS ROM 215, and the CPU 201 can read programs stored in the BIOS ROM 215 via the memory controller 202 and the I/O controller 206. A so-called initial program is stored in the BIOS ROM 215, and the PC 102 is started after power is turned on by this initial program.

The illustrated PC 102 has the wireless communication unit (wireless LAN) 216 as described above. The wireless LAN (WLAN) 216 performs wireless communication with the AP 101 under the control of the I/O controller 206 via a wireless LAN. Namely, the WLAN 216 can send various data to the AP 101 via the WLAN 216. The PC 102 also receives various data from the AP 101, and passes the same to the I/O controller 206.

The I/O controller 206 acts as a physical interface for the AP 101, and executes the lowest-layer potions of control protocols for connection with the Internet. It should be noted that the CPU 201 executes higher-order connection protocols in accordance with control programs stored in the HDD 207.

Figure 3:
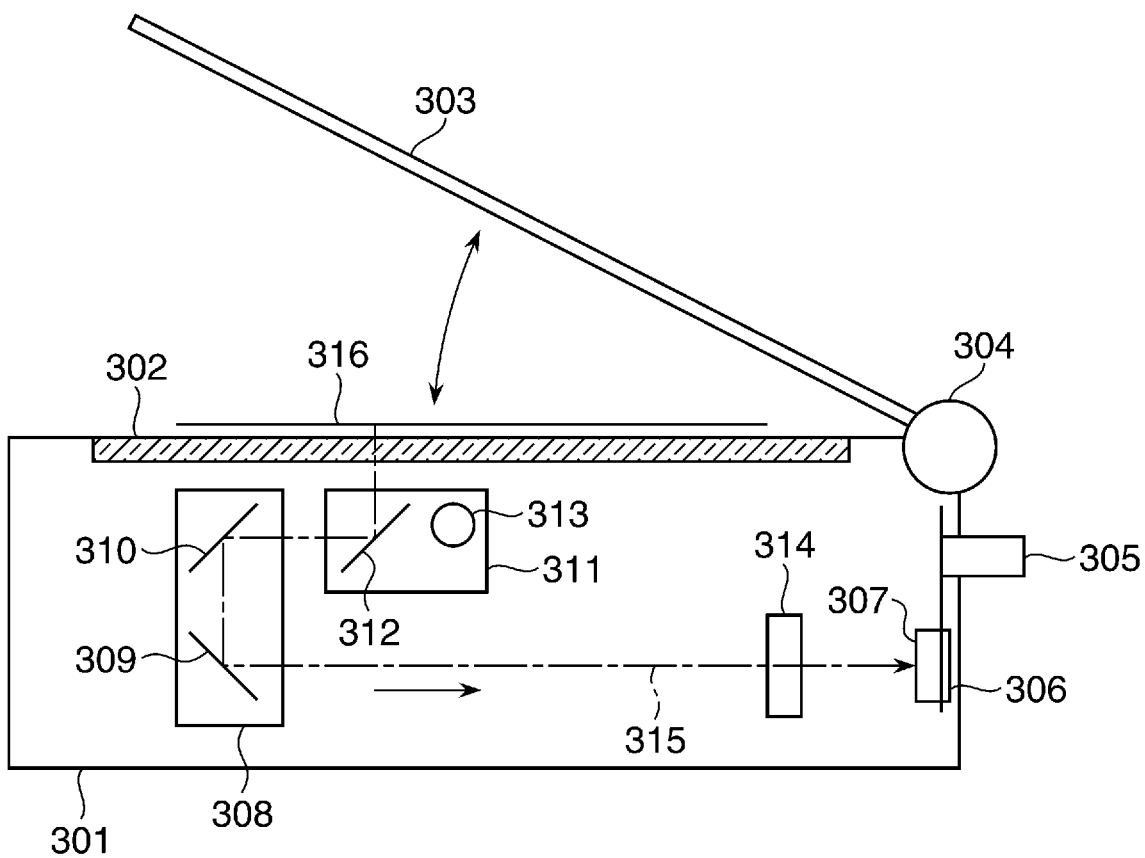
FIG. 3 is a diagram showing an exemplary reader unit provided in an MFP appearing in FIG. 1.

The MFP 103 (FIG. 1) has a reader unit that reads an image on an original and converts the same into digital data, and a printing unit that forms an image on a recording sheet. FIG. 3 is a diagram showing an exemplary reader unit provided in the MFP 103 appearing in FIG. 1.

Referring to FIG. 3, the reader unit (hereafter also referred to as the image reader) has an original platen glass 302, which is made of a transparent material such as glass. An original 316 placed on the original platen glass 302 is brought into close contact with the original platen glass 302 by an original platen cover 303.

The original platen cover 303 is held on the image reader 301 by a hinge 304 rotatably about the hinge 304. It should be noted that in FIG. 3, the original 316 looks like floating above the original platen glass 302, but actually, the original 316 is in close contact with the original platen glass 302.

The original 316 placed on the original platen glass 302 is irradiated with light from a light source 313, and reflected light from the original 316 is transmitted to a CCD (charge-coupled device) 307 along a path 315 (indicated by a broken line) via reflective mirrors 312, 310, and 309. The reflected light forms an image on the CCD 307.

In the illustrated example, the CCD 307 can read images of one line at a time. The illustrated CCD 307 is mounted on a printed board 306, which is equipped with an image processing unit (not shown). The CCD 307 gives the image processing unit an analog image signal corresponding to received light. The analog image signal is converted into a digital image signal by the image processing unit, and sent to the printing unit, to be described later, via an interface connector 305.

Here, the reflective mirrors 309 and 310 are fixed to a first movable unit 308. The first movable unit 308 is connected to a drive motor (not shown) via a gear, and movable in an original sub-scanning direction. The reflective mirror 312 as well as the light source (for example, a xenon lamp) 313 is fixed to a second movable unit 311.

The second movable unit 311 is also connected to the drive motor via another gear, and is movable in the sub-scanning direction as with the first movable unit 308. The moving speed of the first movable unit 308 is set to be half the moving speed of the second movable unit 311, so that the length of the path 315 is kept constant.

The first and second movable units 308 and 311 reads one original by reading one line of the original and then sequentially reading lines while moving in the sub-scanning direction.

Figure 4:
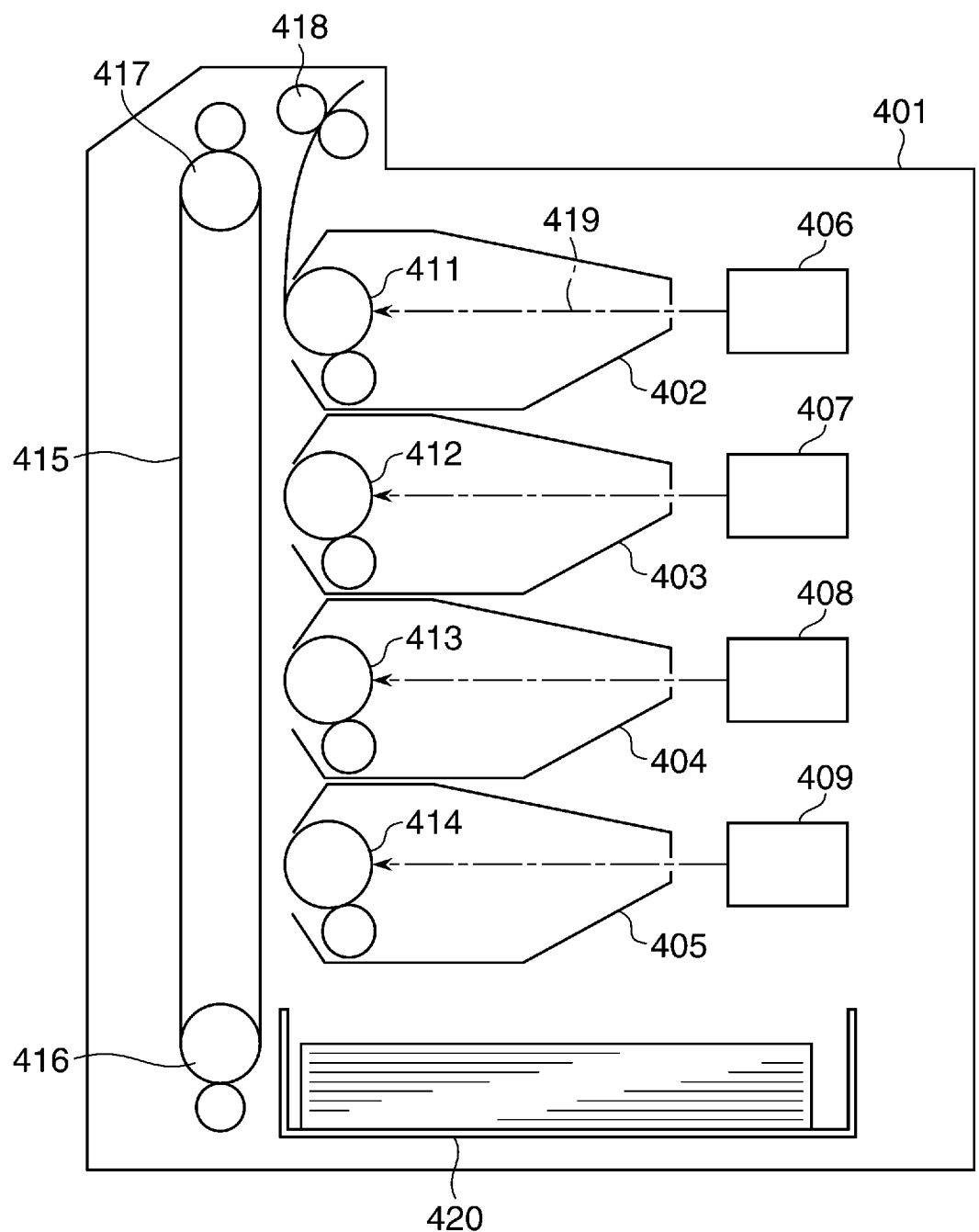
FIG. 4 is a diagram showing an exemplary printing unit provided in the MFP appearing in FIG. 1.

FIG. 4 is a diagram showing an exemplary printing unit provided in the MFP 103 appearing in FIG. 1.

Referring to FIG. 4, the printing unit 401 has a print engine, which forms an image using an electrophotographic process. In the illustrated example, the print engine has photosensitive drums 411 to 414 of respective colors, and uses a so-called four-drums tandem method.

The print engine has toner cartridges 402 to 405 of yellow (Y), cyan (C), magenta (M), and black (K) colors. Each of the toner cartridges 402 to 405 is formed by combining each of the photosensitive drums 411 to 414 and toner/waste toner containers into one unit, and is removable from the print engine.

An image formation signal, to be described later, is input to reader units 406 to 409. In response to the image formation signal, turning-on/off of laser diodes provided in the reader units 406 to 409 is controlled to modulate output intensities thereof. As a result, the intensities of laser beams emitted from the laser diodes are changed.

The laser beams are irradiated onto the photosensitive drums 411 to 414 along a path 419 via optical systems such as a scanning mirror and an f-θ lens. Then, surfaces of the photosensitive drums 411 to 414 are scanned from one end thereof to the other end thereof.

The illustrated photosensitive drums 411 to 414 are rotatively driven by a rotation mechanism (not shown), and electrostatic latent images are formed on the photosensitive drums 411 to 414 by laser beams. The electrostatic latent images on the photosensitive drums 411 to 414 are then developed into visible images (toner images). As a result, toner images of the respective colors are formed on the photosensitive drums 411 to 414.

A plurality of sheets are stacked on and stored in a sheet feed unit 420. The sheets in the sheet feed unit 420 are picked up one by one by a sheet feed mechanism (not shown), and supplied to a sheet conveying belt 415.

The sheet conveying belt 415 is rotatively driven by rollers 416 and 417 to supply the sheet from the sheet feed unit 420 onto the sheet conveying belt 415. As the sheet conveying belt 415 moves, the sheet is conveyed on the sheet conveying belt 415 to reach the photosensitive drums 411 to 414 of the respective colors in succession. The toner images are transferred from the photosensitive drums 411 to 414 onto the sheet, and as a result, a color image (color toner image) is formed on the sheet.

When the sheet reaches an uppermost part in as viewed in the figure, the color image on the sheet is heated and fixed by a fixing unit (not shown). The sheet is then externally output by sheet discharging rollers 418.

Figure 5:
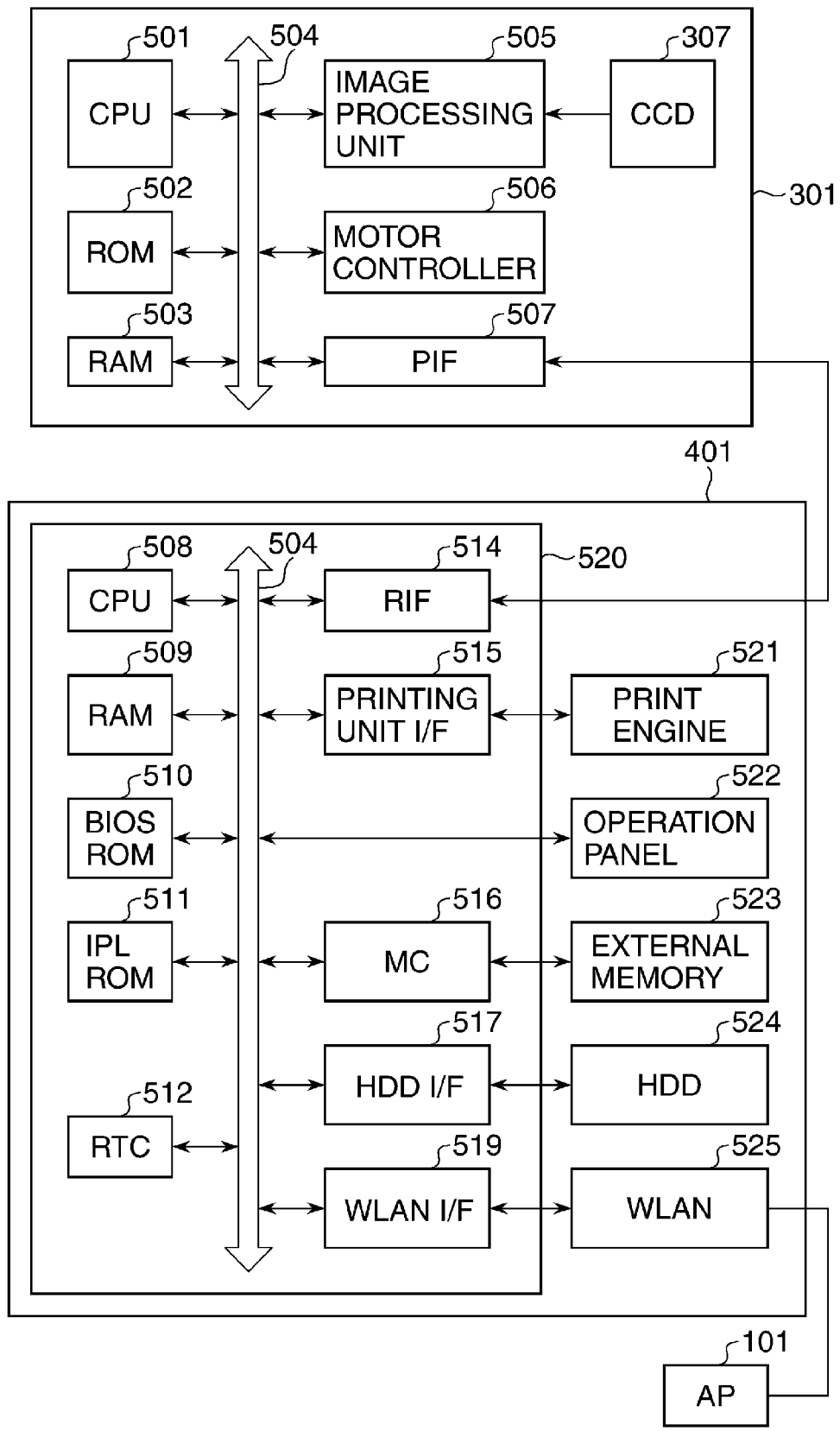
FIG. 5 is a block diagram useful in explaining a control system of the MFP appearing in FIG. 1.

FIG. 5 is a block diagram useful in explaining a control system of the MFP 103 appearing in FIG. 1.

Referring to FIG. 5, the MFP 103 has a wireless communication unit (wireless LAN 525), which enables the MFP 103 to communicate with the PC 102 (other apparatus) via the AP 101. The MFP 103 can select a low power consumption state (energy-saving mode (second state)) in which power consumed by the MFP 103 is reduced.

The reader unit 103 has a CPU 501, a ROM 502, a RAM 503, an image processing unit 505, a motor controller 506, and a printing unit interface (PIF) 507. The CPU 501, the ROM 502, the RAM 503, the image processing unit 505, the motor controller 506, and the PIF 507 are connected together via a system bus 504. The CCD 307 is connected to the image processing unit 505. It should be noted that the illustrated control system is formed on the printed circuit board 306 appearing in FIG. 3.

The CPU 501 controls the entire reader unit 301 in accordance with programs stored in the ROM 502, and processes image data obtained from the CCD 307. Further, the CPU 501 controls interface with the printing unit 401. The RAM 502 is used as a work area for program execution, and stores image data, data being processed, processed data (output data), and so on.

As described above, the image processing unit 505 receives an analog image signal from the CCD 307, and converts a luminance signal included in the analog image signal into density data which is printable by the printing unit 401. Further, the image processing unit 505 converts an image signal input in multiple tones into dither data which is processible by the printing unit 401.

The motor controller 506 controls the drive motors that drive the first and second movable units 308 and 311 described above with reference to FIG. 3. The PIF 507 is a printer interface unit that is connected to the printing unit 401, and interfaces with the printing unit 401. The PIF 507 transfers image data to the printing unit 401 under the control of the CPU 501.

The printing unit 401 has a printer controller 520. The printer controller 520 has a CPU 508, a RAM 509, a BIOS ROM 510, an IPL (initial program loader) ROM 511, a real-time clock unit (RTC) 512, a reader unit interface (RIF) 514, a printing unit I/F 515, a memory controller (MC) 516, an HDD I/F 517, and a WLAN I/F 519. The CPU 508, the RAM 509, the BIOS ROM 510, the IPL ROM 511, the RTC 512, the RIF 514, the printing unit I/F 515, the MC 516, the HDD I/F 517, and the WLAN I/F 519 are connected together by a system bus 513.

The RIF 514 is connected to the PIF 507, and a print engine 521 is connected to the printing unit I/F 515. An external memory 523, an HDD 524, and the wireless communication unit (WLAN) 525 are connected to the MC 516, the HDD I/F 517, and the WLAN I/F 519, respectively. It should be noted that an operation panel 522 is connected to the system bus 513 as shown in the figure.

The CPU 508 controls the entire printer controller 520 in accordance with control programs stored in the BIOS ROM 510 and the HDD 524. It should be noted that the CPU 508 may provide control in accordance with control programs or the like stored in the external memory 523.

Further, the CPU 508 provides control as described hereafter in accordance with programs stored in the BIOS ROM 510, the IPL ROM 511, and the HDD 524.

(1) Based on information obtained from the WLAN 525, the CPU 508 instructs the operation panel 522 to turn off a link LED indicative of a connecting state.

(2) The CPU 508 instructs the operation panel 522 to turn on a link LED indicative of a connecting state.

(3) The CPU 508 brings the printer controller 520 into a low power consumption state.

(4) The CPU 508 returns the printer controller 520 from the low power consumption state.

The RAM 509 is used as a main memory, a work area, and so on for the CPU 508. It should be noted that the amount of memory can be expanded using an optional RAM connected to an expansion port, not shown.

The RAM 509 also temporarily stores input image data sent from the reader unit 301, and is used as an output information expansion area, an environmental data storage area, an NVRAM, and so on when the printer is operating. The CPU 508 outputs image data to the print engine 521 via the printing unit I/F 515, and causes the print engine 521 to form an image.

The BIOS ROM 510 mainly stores control programs and others for initializing input and output and performing basis control related to input and output. The IPL ROM 511 has the function of, for example, reading a program stored in the HDD 524 into the RAM 509, and transferring control. The IPL ROM 511 is used when a snapshot is read from a storage medium into the RAM 509. The RTC 512 measures and stores time.

The RIF 514 receives input image data from the reader unit 301, and sends control information to the reader unit 301. The MC 516 is a memory controller that controls the external memory 523. The external memory 523 is a readable and writable memory connected as an option. For example, font data, emulation programs, and form data are stored in the external memory 523.

It should be noted that there may be not only one external memory 523, but also a plurality of external memories 523. In this case, for example, an external memory storing a program that interprets an option font card or a printer control language of a different language system as well as built-in fonts is connected.

The HDD 524 stores programs to be executed by the CPU 508, image data from the reader unit 301, print data from the PC 102 (FIG. 1), various control information, data files, and so on. It should be noted that data files may be read from other PCs or other MFPs.

The CPU 508 controls the WLAN 525 via the WLAN I/F 519. Output signals output from the WLAN I/F 519 are sent to the AP 101 via the WLAN 525 through wireless communication. As a result, the printer controller 520 can communicate with other copiers, printers and a host computer. In the illustrated example, the WLAN 525 is a WLAN interface card, which has the function of processing a physical layer and a low-level communication protocol for connecting with the AP 101. It should be noted that there may be an NVRAM, not shown, in which printer mode setting information from the operation panel 522 is stored.

Figure 6:
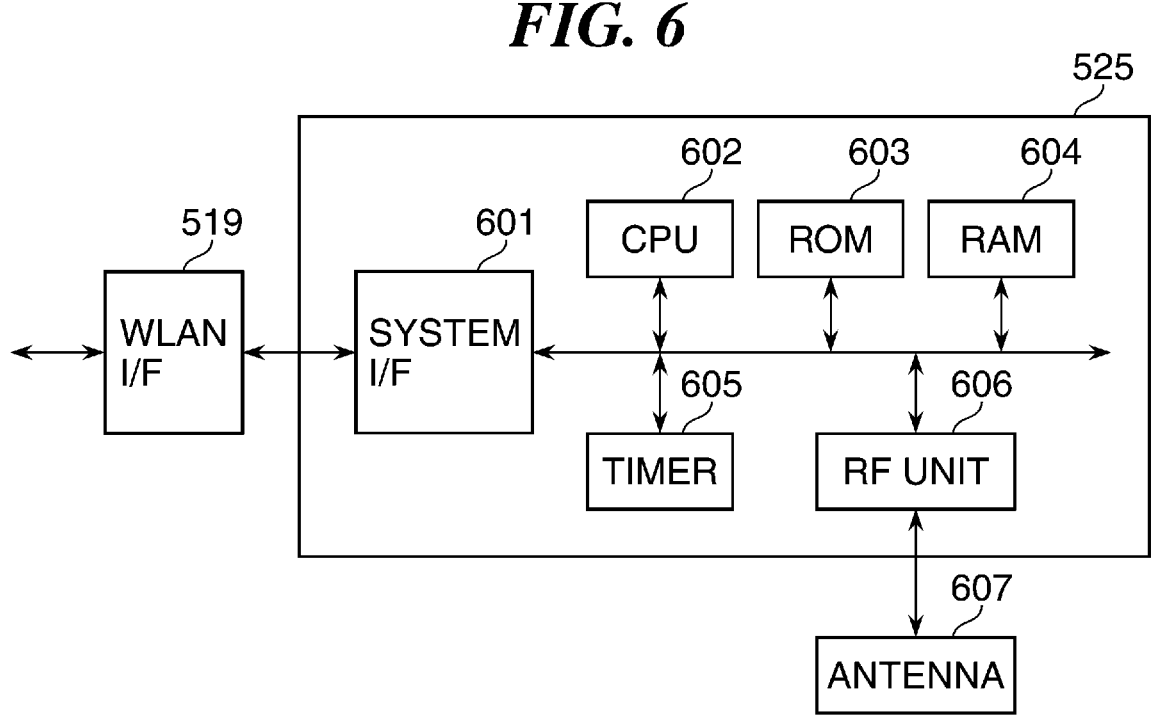
FIG. 6 is a block diagram showing an exemplary WLAN appearing in FIG. 5.

FIG. 6 is a block diagram showing in detail the WLAN 525 appearing in FIG. 5.

Referring to FIG. 6, the WLAN 525 has a system I/F 601, a CPU 602, a ROM 603, a RAM 604, a timer (timer unit) 605, and an RF (radio frequency) unit 606. The WLAN 525 is connected to the WLAN I/F 519 via the system I/F 601, and an antenna 607 is connected to the RF unit 606.

In the illustrated example, the CPU 602 performs control as explained hereafter.

(1) The CPU 602 controls power of the WLAN 525. The CPU 602 partially controls power of blocks shown in the figure. Regarding the RF unit 606 which consumes a large amount of power, the CPU 602 does not operate the RF unit 606 unless the need arises. It should be noted that the CPU 602 itself may stop working. For example, when reception of a beacon signal (wireless sign signal), to be described later, is awaited, only the timer 605 is operating.

(2) The CPU 602 notifies the WLAN I/F 519 that the WLAN 525 goes into an operating state.

(3) The CPU 602 causes the WLAN 525 to return from a low power consumption state (second state).

In the ROM 603, controls programs for the CPU 602 and various data are stored. The RAM 604 is used as a storage area for various data required to execute control programs, as well as a temporary storage area for sent and received data. The timer 605 measures time, and when a predetermined time has elapsed, the timer 605 provides the CPU 602 with a timeout notification. Here, as will be described later, immediately before the arrival of a beacon signal sent from the AP 101 at regular intervals (with predetermined periods), the timer 605 expires and provides the CPU 602 with a timeout notification. In response to this timeout notification, the CPU 602 starts an operation, to be described later.

Figure 7:
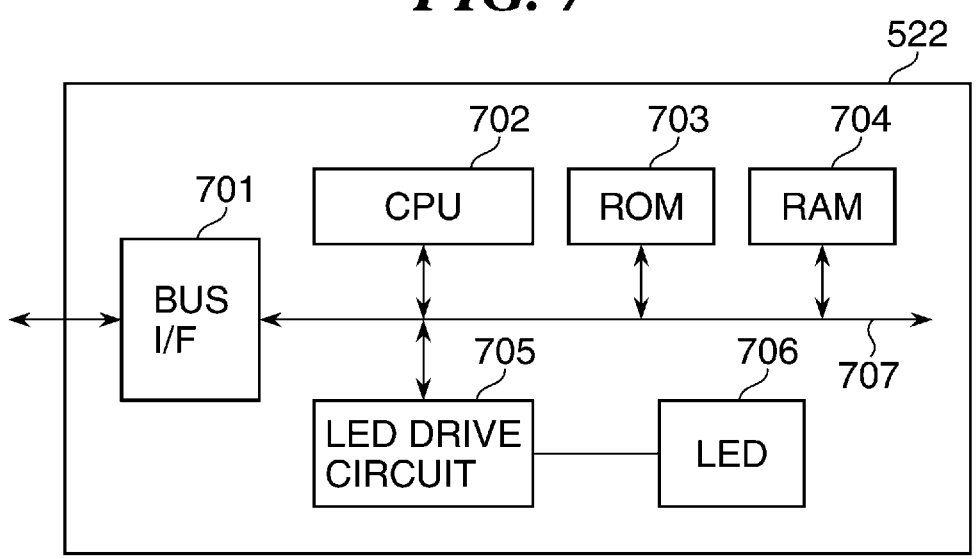
FIG. 7 is a block diagram showing in detail an operation panel appearing in FIG. 5.

FIG. 7 is a block diagram showing in detail the operation panel 522 appearing in FIG. 5.

Referring to FIG. 7, the operation panel 522 has a bus I/F 701, a CPU 702, a ROM 703, a RAM 704, an LED drive circuit 705, and an LED (connecting state display unit) 706. The LED 706 displays a state of connection between the WLAN 525 and the AP 101. The bus I/F 701, the CPU 702, the ROM 703, the RAM 704, the LED drive circuit 705, and the LED 706 are connected together by a bus 707. The operation panel 522 is connected to the system bus 513 by the bus I/F 701.

The CPU 702 controls the entire operation panel 522. The CPU 702 performs, for example, control as explained hereafter.

(1) In response to an instruction from the printer controller 520, the CPU 702 brings the entire operation panel 522 into a low power consumption state. On this occasion, as will be described later, the CPU 702 controls the LED drive circuit 705 to keep the LED 706 blinking.

(2) In response to an instruction from the printer controller 520, the CPU 702 controls the LED drive circuit 705 to turn on or off the LED 706 as will be described later.

(3) In response to an instruction from the printer controller 520, the CPU 702 returns the entire operation panel 522 from the low power consumption state.

In the ROM 703, controls programs executed by the CPU 702 and various data are stored. The RAM 704 is used as a storage area for various data required when the CPU 702 executes control programs. The LED drive circuit 705 keeps the LED 706 on and off even when the operation panel 522 is in the low power consumption state. The LED (light-emitting diode) 706 notifies the user that the WLAN 522 and the AP 101 are in a state of being linked to each other, that is, the state of being able to communicate with each other.

A predetermined wireless sign signal (beacon signal) is sent to the PC 102 and the MFP 103 periodically (with predetermined periods) through wireless communication. The beacon signal includes various information required to control a wireless LAN. For example, the beacon signal includes beacon period information indicative of the period with which the beacon signal is sent, and data arrival information indicative of the arrival of data destined to the MFP 103.

Figure 8A:
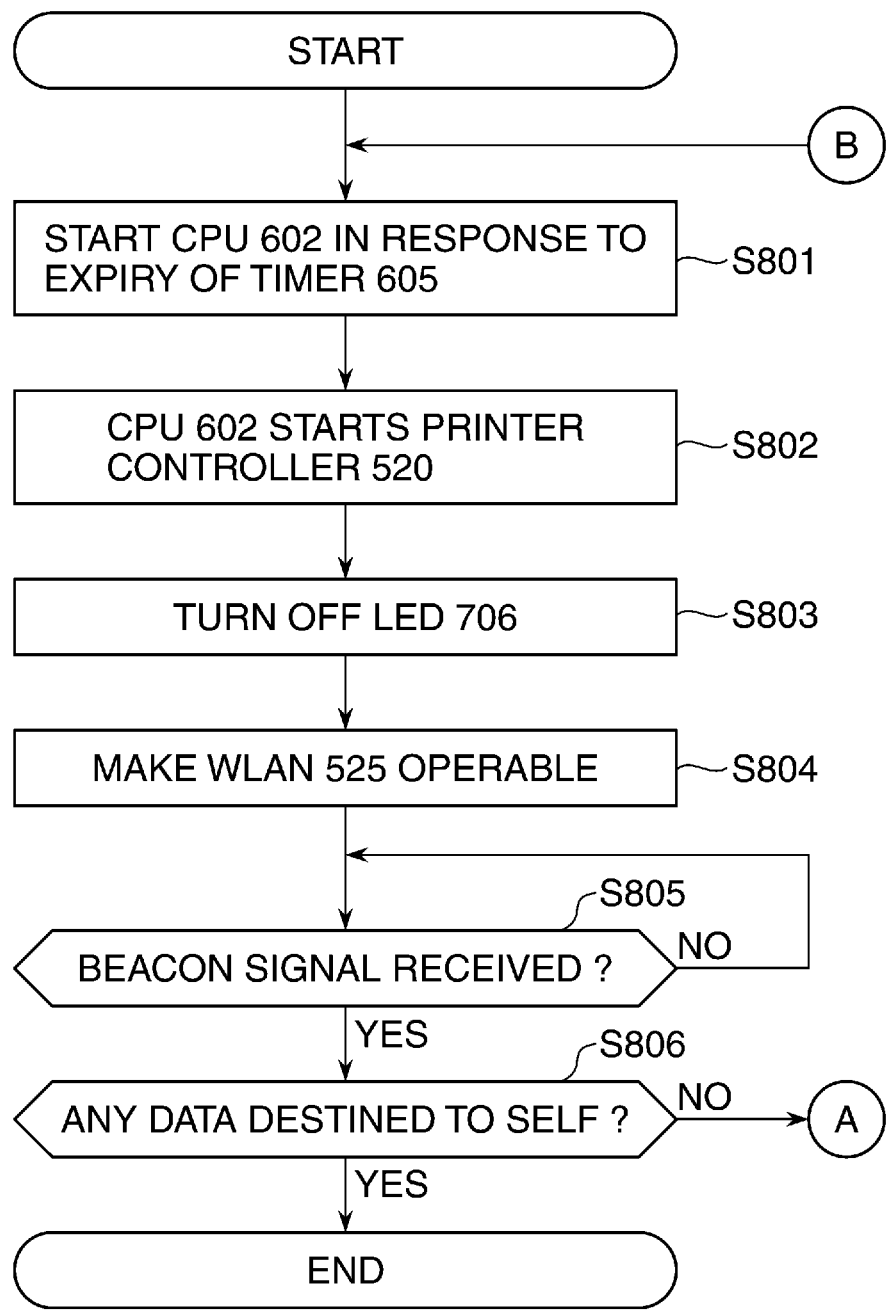
FIGS. 8A and 8B are flowcharts useful in explaining an exemplary operation of a printer controller and the WLAN appearing in FIG. 5.
Figure 8B:
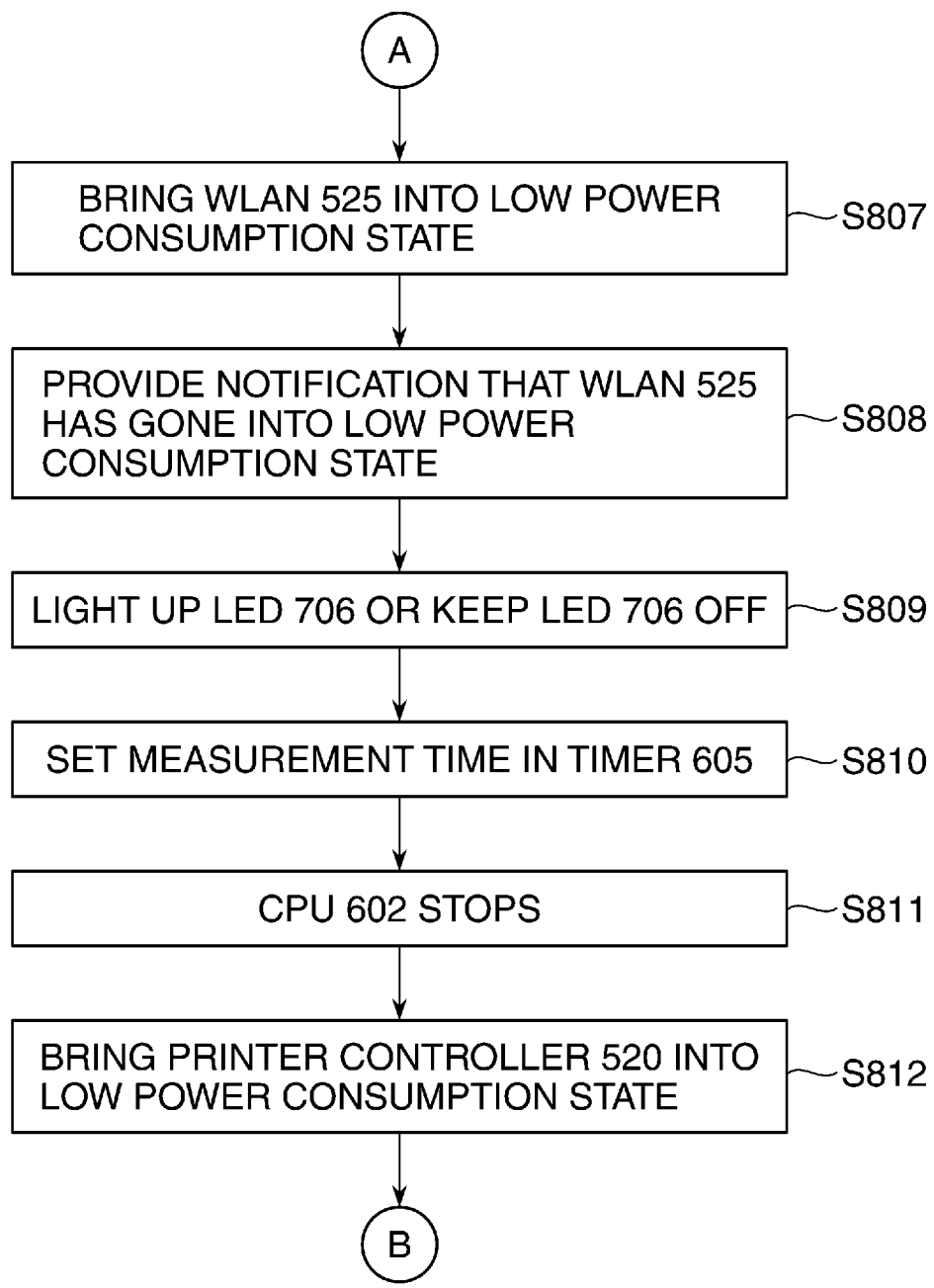
Figure 9:
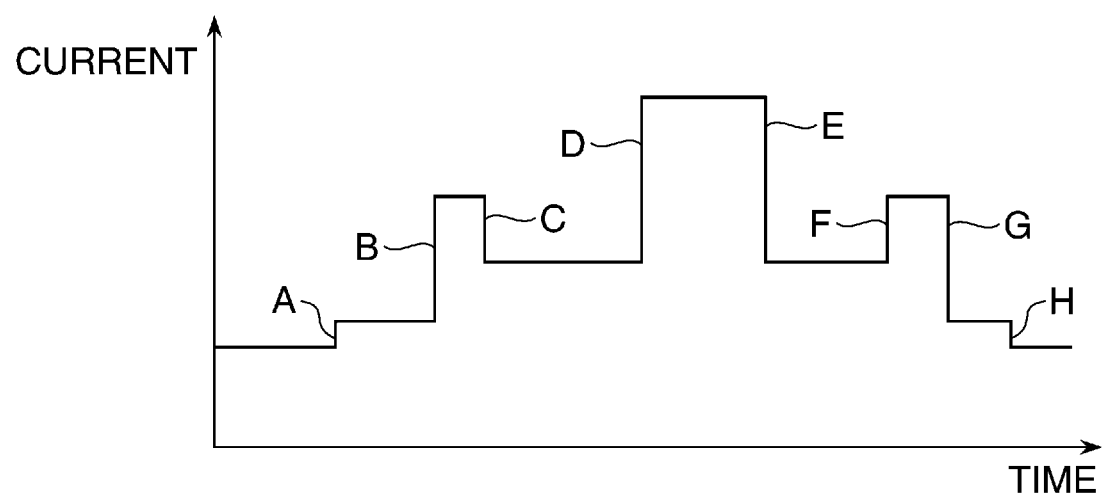
FIG. 9 is a diagram showing changes in consumption power when the operation in FIGS. 8A and 8B is carried out.

FIGS. 8A and 8B are flowcharts useful in explaining an exemplary operation of the printer controller 520 and the WLAN 525 appearing in FIG. 5. FIG. 9 is a diagram showing changes in current when the operation in FIGS. 8A and 8B is carried out.

Referring to FIGS. 5 to 9, in the WLAN 525, the CPU 602 starts upon receiving a count-up signal sent from the timer 605 (step S801). On this occasion, current is consumed as indicated by a symbol A in FIG. 9. In the timer 605, a time obtained based on the beacon period information received via the antenna 607 is set as a measurement time. Immediately before receiving the beacon signal (that is, immediately before the AP 101 sends out the beacon signal), the timer 605 counts up the measurement time, and sends out the count-up signal mentioned above. Namely, a measurement time slightly shorter than a time corresponding to the period with which the beacon signal is sent out is set in the timer 605, and upon counting up the measurement time, the timer 605 sends out the count-up signal.

Then, the CPU 602 starts the printer controller 520 being in a low power consumption state via the system I/F 601 and the WLAN I/F 519 (step S802). On this occasion, current is consumed as indicated by a symbol B in FIG. 9. Thus, the CPU 508 goes into an operating state, and sends out an LED turn-off signal to the operation panel 522. As a result, the CPU 702 controls the LED drive circuit 705 to turn off the LED 706 (step S803). On this occasion, the LED turn-off signal is given to the WLAN 525 as well. Current is consumed as indicated by a symbol C in FIG. 9.

In response to the LED turning-off signal (that is, at the time at which the LED 706 is turned off), the CPU 602 controls power of the entire WLAN 525 including the RF unit 606 to bring the WLAN 525 into an operable state (step S804). On this occasion, current is consumed as indicated by a symbol D in FIG. 9. Then, the CPU 602 determines whether or not the beacon signal has been received from the AP 101 (FIG. 1) (step S805).

When the beacon signal has not been received (NO in the step S805), the CPU 602 stands by until it receives the beacon signal from the AP 101. On the other hand, When the beacon signal has been received (YES in the step S805), the CPU 602 analyzes the beacon signal to determine whether or not there is print data (communication information) or the like destined to the MFP 103 (destined to self) (step S806). When there is print data or the like destined to the MFP 103 (YES in the step S806), the CPU 602 moves to an operation for receiving print data or the like. Namely, the CPU 602 terminates the operation that returns from the low-power consumption state.

When there is no print data or the like destined to the MFP 103 (NO in the step S806), the CPU 602 stops operation of component parts (in particular, the RF unit 606) other than the timer 605 and the CPU 602 itself to move into the low power consumption state (step S807). On this occasion, current is consumed as indicated by a symbol E in FIG. 9.

Then, the CPU 602 notifies the CPU 508 that the WLAN 525 has moved into the low power consumption state (step S808). In response to this notification, the CPU 508 sends the CPU 702 an LED control signal indicative of whether to light up the LED 706 or keep the LED 706 off, as will be described later. As a result, the CPU 702 controls the LED drive circuit 705 to light up the LED 706 or keep the LED 706 off (step S809). When the LED 706 is lit up, current is consumed as indicated by a symbol F in FIG. 9.

The CPU 602 sets the measurement time mentioned above based on the beacon period information (step S810). Then, the CPU 602 stops operation (step S811), and stands by until it receives a count-up signal from the timer 605. On this occasion, current is consumed as indicated by a symbol G in FIG. 9. After sending out the LED control signal, the CPU 508 brings the operation panel 522 into the low power consumption state, and then brings the printer controller 520 into the low power consumption state (step S812). On this occasion, current is consumed as indicated by a symbol H in FIG. 9.

As a result, the CPU 508 itself goes into the low power consumption state, and waits for a signal from the WLAN 525. The control then shifts to the step S801.

Figure 10A:
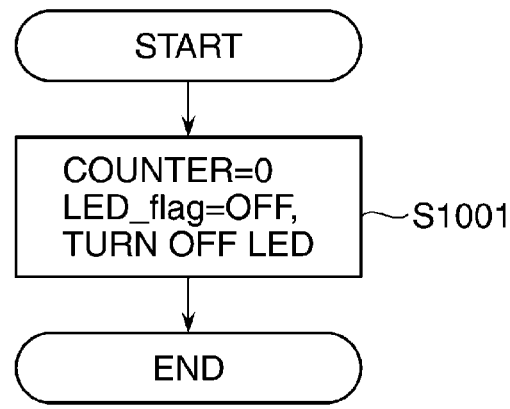
Figure 10B:
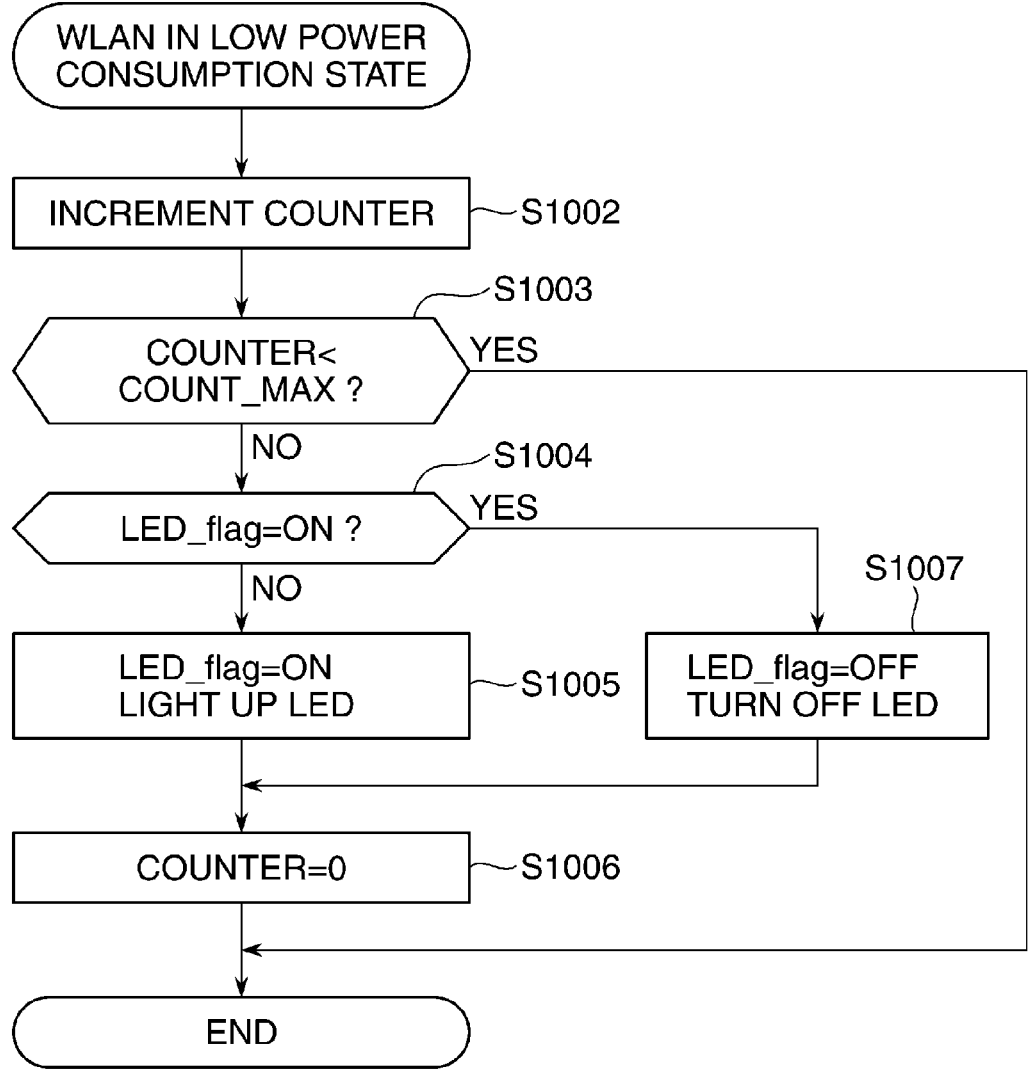

FIGS. 10A and 10B are flowcharts useful in explaining how turning-on/off of the LED 706 is controlled by the printer controller 520 appearing in FIG. 5, in which FIG. 10A is a flowchart useful in explaining a process carried out to start the MFP 103, and FIG. 10B is a flowchart useful in explaining a process carried out after the WLAN 525 goes into the low power consumption state.

Referring first to FIGS. 5 to 7 and 10A, when started, the MFP 103 executes an initialization step. First, the CPU 508 initializes a counter incorporated therein (a built-in counter: COUNTER). Then, the CPU 508 performs counting using the built-in counter as will be described later. Next, the CPU 508 clears (OFF) an LED flag (LED_flag). The LED_flag is a flag indicative of whether or not the LED 706 is on (flag information). This flag is held in the CPU 508. Namely, the CPU 508 acts as a flag storage unit.

When the LED_flag is OFF, this indicates that the LED 706 is off. When the LED_flag is ON, this indicates that the LED 706 is on. In the initialization step, the CPU 508 turns off the LED 706 (step S1001).

Referring next to FIGS. 5 to 7 and 10B, when the WLAN 525 goes into the low power consumption state as described above, the CPU 508 increments the built-in counter (COUNTER: counter unit) (step S1002). Then, the CPU 508 determines whether or not a count time (COUNTER) counted by the built-in counter is less than the maximum count time (predetermined count time: COUNT_MAX) (step S1003). The predetermined count time is arbitrarily set by the user.

When the time counted by the counter is less than the maximum count time (YES in the step S1003), the CPU 508 terminates the process. On the other hand, when the time counted by the counter becomes not less than the maximum count time (NO in the step S1003), the CPU 508 checks whether or not the LED_flag is ON (step S1004).

When the LED_flag is OFF (NO in the step S1004), the CPU 508 sets the LED_flag, and sends the CPU 702 an LED control signal that instructs the CPU 702 to light up the LED 706 (step S1005). Then, the CPU 508 initializes the counter (COUNTER) to zero (step S1006), and terminates the process.

On the other hand, when the LED_flag is ON (YES in the step S1004), the CPU 508 clears the LED_flag, and sends the CPU 702 an LED control signal that instructs the CPU 702 to turn off the LED 706 (step S1007). Then, the CPU 508 shifts to the step S1006 wherein it initializes the counter (COUNTER) to zero, and terminates the process.

As described above, in the MFP 103 according to the embodiment of the present invention, when a time corresponding to a period (predetermined period) with which a beacon signal (wireless sign signal) is sent from the AP 101, the WLAN 525 returns from the low power consumption state. The MFP 103 turns off the LED 706 when the WLAN 525 returns from the low power consumption state. Then, when the WLAN 525 lies in the low power consumption state, the MFP 103 intermittently turns off the LED 706. Thus, turning-on/off of the LED 706 is controlled according to whether or not the WLAN 525 lies in the low power consumption state, and hence it is possible not only to notify the user of a state of connection between the WLAN 525 and the AP 101 and an operating state of the WLAN 525, but also to reduce power consumption.

It should be noted that as is clear from the above description, the CPU 702, the LED drive circuit 705, and the LED 706 act as a notification unit. The CPU 602 and the timer 605 act as a timer unit, and the CPU 602 acts as a returning unit. Moreover, the CPU 508 acts as a control unit. Further, the CPU 602 also acts as a determination unit.

Moreover, the functions of the embodiment described above may be a control method, and this control method may be executed by a computer which the MFP 103 has. Further, a program having the functions of the embodiment described above may be a control program, and this control program may be executed by a computer which the MFP 103 has. In this case, the control method and the control program have at least a returning step and a control step.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-135022 filed Jun. 14, 2010, which is hereby incorporated by reference herein in its entirety.

What is claimed is:

1. An electronic apparatus comprising:
   a wireless communication unit communicable with other apparatuses using the wireless communication unit via a wireless communication access point;
   a notification unit configured to provide notification that the wireless communication unit lies in a second state in which a smaller amount of power is consumed than in a first state;
   a returning unit configured to, based on a time corresponding to a predetermined period of a beacon signal transmitted from the wireless communication access point, return the wireless communication unit into the first state from the second state; and
   a control unit configured to, when the wireless communication unit lies in the second state, intermittently disable said notification unit, and when the wireless communication unit returns from the second state into the first state, disable said notification unit.

2. The electronic apparatus according to claim 1, further comprising:
   a determination unit configured to, when the wireless communication unit receives the beacon signal from the wireless communication access point after the wireless communication unit returns from the second state into the first state, determine whether there is communication information destined to self,
   wherein said returning unit brings the wireless communication unit into the second state when said determination unit determines that there is no communication information destined to self.

3. The electronic apparatus according to claim 1, further comprising:
   a timer unit configured to measure a time corresponding to the predetermined period,
   wherein said returning unit returns the wireless communication unit from the second state into the first state when said timer unit counts up the time.

4. The electronic apparatus according to claim 1, further comprising:
- a flag storage unit configured to store flag information indicative of whether said notification unit is an enabled state or a disabled state; and
- a counting unit configured to start counting a predetermined count time when the wireless communication unit goes into the second state,
- wherein, when a count time counted by said counting unit becomes not less than the predetermined count time, said control unit intermittently disables said notification unit by enabling said notification unit when the flag information is indicative of the disabled state, and disabling said notification unit when the flag information is indicative of the enabled state.

5. The electronic apparatus according to claim 1, wherein said notification unit includes a lamp that indicates a state of connection with the wireless communication access point.

6. A control method for an electronic apparatus having a wireless communication unit and capable of communicating with other apparatuses using the wireless communication unit via a wireless communication access point, the control method comprising:
- a notification step of providing notification that the wireless communication unit lies in a second state in which a smaller amount of power is consumed than in a first state;
- a returning step of, based on a time corresponding to a predetermined period of a beacon signal transmitted from the wireless communication access point, returning the wireless communication unit into the first state from the second state; and
- a notification control step of, when the wireless communication unit lies in the second state, controlling to intermittently disable notification provided in said notification step, and when the wireless communication unit returns from the second state into the first state, controlling to disable notification provided in said notification unit.

7. A non-transitory computer-readable storage medium storing a control program for causing a computer to implement a control method for an electronic apparatus having a wireless communication unit and capable of communicating with other apparatuses using the wireless communication unit via a wireless communication access point, the control method comprising:
- a notification step of providing notification that the wireless communication unit lies in a second state in which a smaller amount of power is consumed than in a first state;
- a returning step of, based on a time corresponding to a predetermined period of a beacon signal transmitted from the wireless communication access point, returning the wireless communication unit into the first state from the second state; and
- a notification control step of, when the wireless communication unit lies in the second state, controlling to intermittently disable notification provided in said notification step, and when the wireless communication unit returns from the second state into the first state, controlling to disable notification provided in said notification unit.

8. An electronic apparatus comprising:
- a wireless communication unit;
- a notification unit configured to provide notification that the wireless communication unit is operating in a second state in which a smaller amount of power is consumed than in a first state;
- a returning unit configured to return the wireless communication unit into the first state from the second state to receive a signal transmitted from an external device with a predetermined period; and
- a control unit configured to, when the wireless communication unit has returned into the first state in a state in which said notification unit had provided notification, control said notification unit to not provide notification while the wireless communication unit is operating in the second state, and when the wireless communication unit has returned into the first state in a state in which said notification unit had not provided notification, control said notification unit to provide notification while the wireless communication unit is operating in the second state.

9. A control method for an electronic apparatus having a wireless communication unit, the method comprising:
- a notification step of proving notification that the wireless communication unit is operating in a second state in which a smaller amount of power is consumed than in a first state;
- a returning step of returning the wireless communication unit into the first state from the second state to receive a signal transmitted from an external device with a predetermined period; and
- a control step of, when the wireless communication unit has returned into the first state in a state in which a notification had been provided in said notification step, controlling to not provide notification in said notification step while the wireless communication unit is operating in the second state, and when the wireless communication unit has returned into the first state in a state in which notification had not been provided in said notification step, controlling to provide notification in said notification step while the wireless communication unit is operating in the second state.

10. A non-transitory computer-readable storage medium storing a control program for causing a computer to implement a control method for an electronic apparatus having a wireless communication unit, the control method comprising:
- a notification step of proving notification that the wireless communication unit is operating in a second state in which a smaller amount of power is consumed than in a first state;
- a returning step of returning the wireless communication unit into the first state from the second state to receive a signal transmitted from an external device with a predetermined period; and
- a control step of, when the wireless communication unit has returned into the first state in a state in which a notification had been provided in said notification step, controlling to not provide notification in said notification step while the wireless communication unit is operating in the second state, and when the wireless communication unit has returned into the first state in a state in which notification had not been provided in said notification step, controlling to provide notification in said notification step while the wireless communication unit is operating in the second state.

11. An electronic apparatus comprising:
- a wireless communication unit;

a notification unit configured to provide notification that the wireless communication unit is operating in a second state in which a smaller amount of power is consumed than in a first state;

a returning unit configured to return the wireless communication unit into the first state from the second state to receive a signal transmitted from an external device with a predetermined period; and a switching unit configured to switch between whether or not to provide notification when the wireless communication unit has returned into the first state by said returning unit and while the wireless communication unit is operating in the second state.

12. A control method for an electronic apparatus having a wireless communication unit, the method comprising:

a notification step of providing notification that the wireless communication unit is operating in a second state in which a smaller amount of power is consumed than in a first state;

a returning step of returning the wireless communication unit into the first state from the second state to receive a signal transmitted from an external device with a predetermined period; and a switching step of switching between whether or not to provide notification when the wireless communication unit has returned into the first state in said returning unit and while the wireless communication unit is operating in the second state.

13. A non-transitory computer-readable storage medium storing a control program for causing a computer to implement a control method for an electronic apparatus having a wireless communication unit, the control method comprising:

a notification step of providing notification that the wireless communication unit is operating in a second state in which a smaller amount of power is consumed than in a first state;

a returning step of returning the wireless communication unit into the first state from the second state to receive a signal transmitted from an external device with a predetermined period; and a switching step of switching between whether or not to provide notification when the wireless communication unit has returned into the first state in said returning unit and while the wireless communication unit is operating in the second state.

* * * * *